United States Patent [19]
Darmstadt et al.

[11] 4,262,457
[45] Apr. 21, 1981

[54] PNEUMATIC STRUCTURES

[76] Inventors: Robert M. Darmstadt; Robert W. Darmstadt, both of 263 D. S. Tenth Ave., Highland Park, N.J. 08904

[21] Appl. No.: 941,599

[22] Filed: Sep. 12, 1978

[51] Int. Cl.³ .............................................. E04B 1/345
[52] U.S. Cl. .......................................... 52/2; 126/417
[58] Field of Search ........................... 52/2, 80, 82, 83; 126/271

[56] References Cited

U.S. PATENT DOCUMENTS

| | | | |
|---|---|---|---|
| 1,970,502 | 8/1934 | Hamza | 52/2 |
| 3,161,553 | 12/1964 | Visser | 52/2 X |
| 3,256,895 | 6/1966 | Duquette | 52/2 |
| 3,337,418 | 8/1967 | Halacy | 52/2 X |
| 3,918,518 | 11/1975 | James | 52/2 X |
| 4,004,380 | 1/1977 | Kwake | 52/2 |
| 4,047,335 | 9/1977 | Darmstadt | 52/2 |
| 4,146,996 | 4/1979 | Arnesen | 52/2 |

FOREIGN PATENT DOCUMENTS

| | | | |
|---|---|---|---|
| 2718097 | 10/1978 | Fed. Rep. of Germany | 52/2 |
| 502102 | 4/1976 | U.S.S.R. | 52/2 |

OTHER PUBLICATIONS

International Nickel "Nickel Stainless Steel Membrane Structures", pp. 12, 13 and 15 relied upon Nov. 16, 1972.

Primary Examiner—J. Karl Bell
Attorney, Agent, or Firm—Jacobs & Jacobs

[57] ABSTRACT

The pneumatic structure comprises a pneumatic compression ring having a top cover under tension and being suspended from support columns by means of a cable system, the structure being suitably stiffened. A lower membrane can be attached to the lower portion of the pneumatic compression ring to create an inner space for holding equipment, such as a solar energy collector.

9 Claims, 11 Drawing Figures

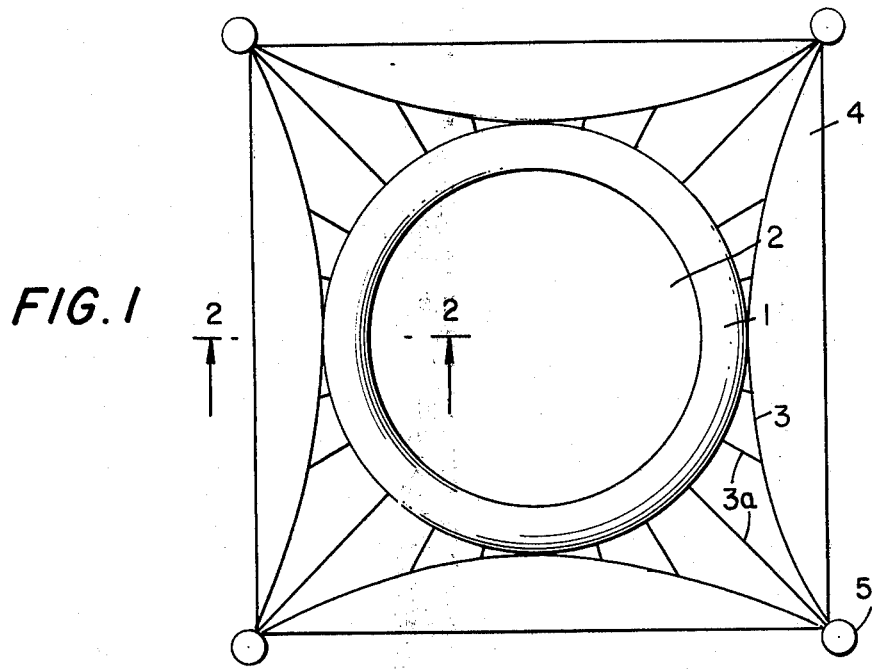
FIG. 1
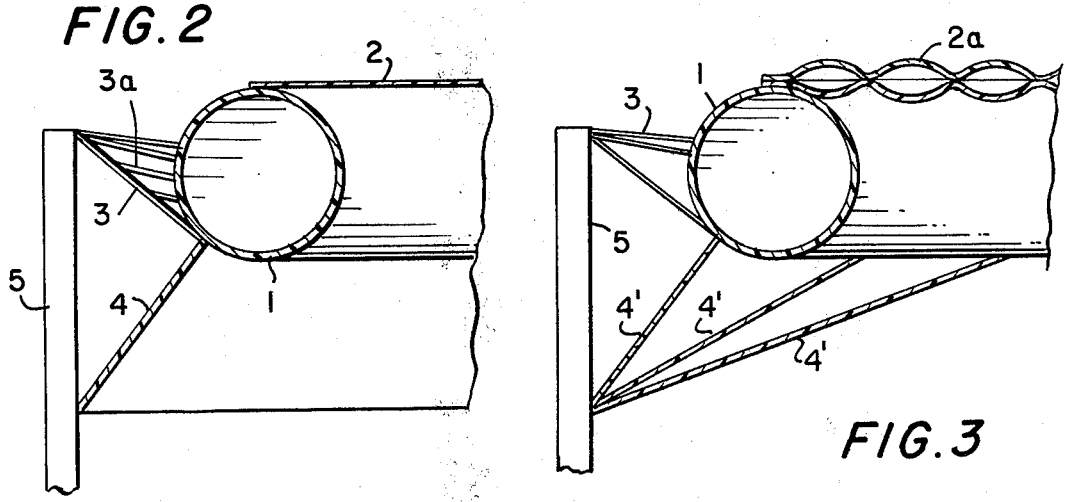
FIG. 2
FIG. 3
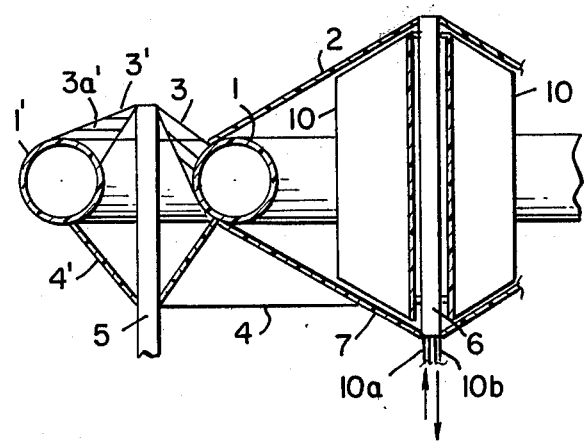
FIG. 4

PNEUMATIC STRUCTURES

The present invention relates to pneumatic structures, and particularly pneumatic roof structures and pneumatic structures for solar energy collectors.

Pneumatic roof structures have been previously proposed, but these have been of the type where the entire building is an inflated envelope, or a series of inflated cells supported on peripheral columns, or a large bag-like structure held in a network of cables. Such structures have inherent size limitations and are expensive to construct and maintain.

The present invention is based on a novel pneumatic structure in which a pneumatic compression ring has a top cover attached thereto and is supported from peripheral columns by means of a system of cables. The compression ring in combination with the supporting cable system resolve wind and snow loads as well as dead loads on the roof, thus permitting a large size with low weight.

The structure also encompasses the use of a lower skin or membrane to create an enclosed inner space ideally suited to house solar energy collection equipment of large size. In such cases, the top cover is transparent to solar radiation.

We are aware of U.S. Pat. No. 4,047,335, issued Sept. 13, 1977 to one of us, and of "Pneumatic Structures", by Thomas Herzog, Oxford University Press, 1976. So far as we are aware, the structures of the present invention have not been previously described.

The present invention is illustrated by the accompanying drawings, in which:

FIG. 1 is a plan view of the pneumatic roof structure according to the invention;

FIG. 2 is a view in section along lines 2—2 in FIG. 1;

FIG. 3 is a detail view in section of another embodiment of the invention;

FIG. 4 is a detail view in section of another embodiment of the invention;

Figure 5:
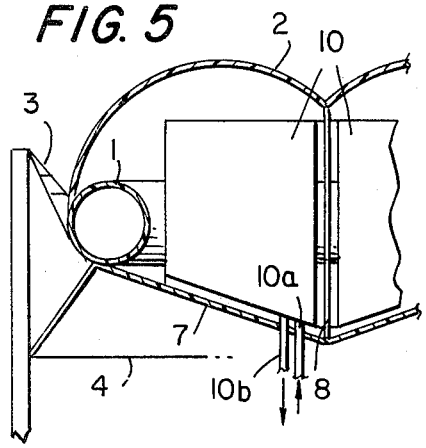
FIG. 5 is a detail view in section of another embodiment of the invention.

Referring to FIG. 1, the roof structure according to the invention comprises a pneumatic compression ring 1 made of any suitable material, such as rubber, reinforced fabric, plastic, e.g. nylon, or the like having a top cover 2 attached by means of stitching or other fastening. The ring 1 is supported by four main cables 3 and a skirt 4 from columns 5. The cables 3 are attached at opposite ends to adjacent columns 5 and at their midpoint to the ring 1 itself. A system of auxiliary cables 3a is connected between the main cables 3 and the ring 1. Desirably, the cables 3 and 3a are tangent to the ring 1 at its lower portion. Skirt 4 is made of any suitable material, such as reinforced fabric or plastic material, and serves to stabilize the structure against upward forces. In lieu of the skirt 4, a series of cables 4' (FIG. 3) can be employed.

The top cover 2 is under tension, and can be reinforced by the longitudinally extending pneumatic ribs 2a (FIG. 3), which are preferred but not essential.

The pneumatic compression ring 1 and its cover 2 provide a large rigid roof structure that is light in weight and can employ a small number of widely spaced columns without sacrificing structural strength. Through the use of the pneumatic ring 1 with a large span and supporting cables 3, a roof structure is formed with a high live load and low dead weight.

The cables 4 or skirt 4' act as stiffeners and resist vibration, and hence are desirable. Further stiffening is obtained by the pneumatic ribs 2a (FIG. 3).

It is preferred that the ring 1 be a toroid, with a constant circular cross-section, but the ring can be of any oblong shape in plan and the vertical cross-section can be of any oblong shape and can be of different cross-section at different points on the ring. For example, the ring may be elliptical in plan with an elliptical or circular cross-section. In any oblong shape in plan, the arcs of the larger radius of curvature will require larger cross-sections than arcs of smaller cross-section. If desired, the ring 1 can be multi-cellular or can be comprised of several discrete rings bundled together (not shown).

Columns 5 are preferably vertical and outside the ring 1 as shown, but internal columns (not shown) can be used instead so long as the ring is fully supported from the columns by cables or reinforced fabric.

FIG. 4 depicts the roof structure of FIGS. 1 and 2 modified to include an outer pneumatic compression ring 1', which is supported from columns 5 by means of upper cables 3' and auxiliary cables 3a' and lower cables 4'. By the use of the second ring 1', the inward pull on the columns 5 is reduced.

FIG. 4 shows a roof structure with a substantial inner space created by means of the vertical column 6 that extends from lower membrane 7 to the top cover 2. Preferably, the lower membrane 7 is inwardly tensioned to help resolve the downward forces exerted on membrane 7 by column 6. Column 6 preferably tensions both the cover 2 and the membrane 7, and the inward forces thus produced are counterbalanced by the outward forces developed by ring 1.

It is to be understood that ring 1' can be used with any of the structures shown in the drawings, and, conversely, the structure of FIGS. 4 and 5 does not require the use of ring 1'.

Pneumatic roof structures with a substantial inner space can be used to advantage in solar energy devices. Thus, if cover 2 is transparent to solar radiation, a solar collector 10 (FIG. 4) or solar cells (not shown) can be located on membrane 7 by means of or supported from column 6.

The solar collector 10 is shown diagramatically and may be an array of heat exchange tubes through which is passed a suitable heat exchange fluid, such as air. The inlet 10a and outlet 10b from the bundle of tubes pass through the column 10c and through apertures (not shown) in the membrane 7, which are tightly sealed to the inlet 10a and outlet 10b as by adhesive or the like. Preferably, the inner surface of membrane 7 is black to absorb radiation transmitted through cover 2. Inlet 10a may be connected to a fan (not shown) for forcing air through the collector 10 via the inlet 10a and outlet 10b. Alternatively, inlet 10a can be connected to a pump (not shown) for pumping water or other heat exchange liquid through the collector 10.

The compression ring 1 (and 1' if used) will bear all of the weight of the solar energy collection equipment 10 and resolve the inward forces produced in the membrane 7 (as a result of the equipment) thus reducing the load on cables 3 and, in turn, reducing the weight of the structure. Further, the upper membrane 2 and lower membrane 7 shield the solar energy equipment 10 in the structure from weather and wind, and thus the load on the solar energy equipment 10 is less than in an unprotected system.

FIG. 5 is another variant of the invention, and shows a structure in which the interior space is pressurized, in contrast with FIG. 4 where the interior space is at atmospheric pressure. In the structure of FIG. 5, a tension tie 8 is provided between the transparent top cover 2 and bottom membrane 7. Tension tie 8 will support, in whole or in part, the solar energy collector 10 inside the structure and will reduce the stress in the top cover 2 and lower membrane 7. Pressurizing the structure produces a rigid structure resistant to wind forces, and the outward pull exerted by the ring 1 acts to flatten membrane 7 to maintain the floor of the structure relatively flat.

Figure 6:
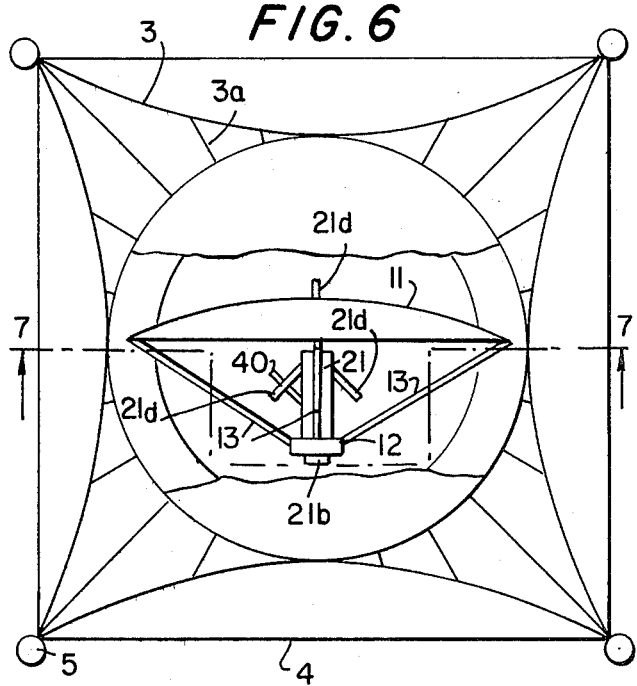
FIG. 6 is a plan view of another embodiment of the invention with part of the top cover broken away.
Figure 7:
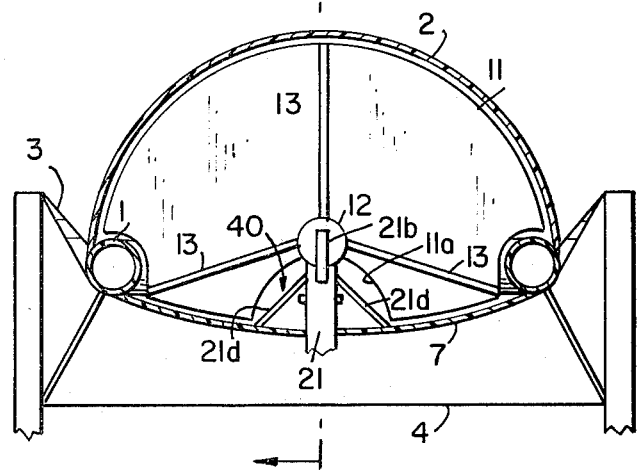
FIG. 7 is a view in section along lines 7—7 in FIG. 6.
Figure 8:
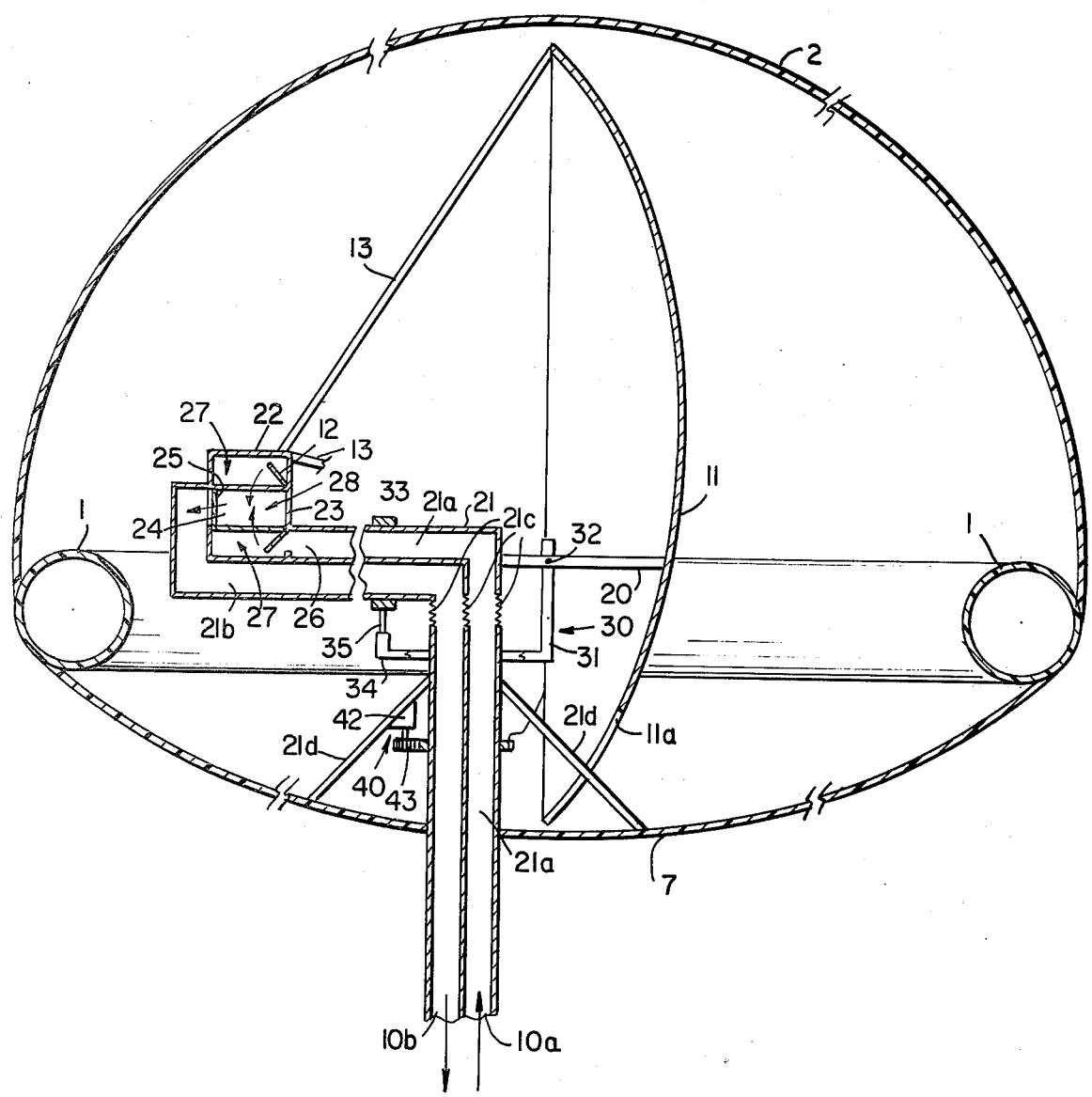
FIG. 8 is view, in section, taken along lines 8—8 in FIG. 7.

FIGS. 6, 7 and 8 show a pressurized structure without the tension tie 8. In such a case, a dome-like structure is obtained with a large, unobstructed inner space for more or larger equipment. Without the central tension tie, the structure of FIGS. 6-8 relies on the ring 1 to counterbalance the inward forces. The structure of FIGS. 6-8 is large enough to include room for a parabolic or fresnel zoned reflector 11 designed to focus the solar radiation transmitted through the transparent cover 2 onto the heat exchanger 12 which is at the focus of the reflector 11. Reflector 11 can be reinforced by ribs (not shown) or the like.

As can be most clearly seen in FIG. 8, the reflector is secured to a rod 20, while the heat exchanger 12 is carried by duct 21. Rod 20 is secured to duct 21 so as to cause the heat exchanger 12 to move with the reflector 11 in a manner to be described below.

The heat exchanger 12 includes a cylindrical housing 22 in which is mounted a circular window 23 of glass or other transparent material, such as Lexan plastic, a cylindrical coil of screening 24 and circular screens 25. The duct 21 has an inlet duct section 21a and an outlet duct section 21b. Air or other heat exchange fluid is admitted to duct 21a via inlet 10a and flows through aperture 26 in heat exchanger 12 into the annulus 27 formed around coil 24. The fluid then flows through the coil 24 into central chamber 28 and exits the collector through screens 25 into outlet duct 21b. Solar energy passing through the cover 2 will be reflected by reflector 11 through the window 23 into chamber 28 where it will heat the fluid passing through. Heated fluid is removed via outlet 10b. To provide flow of the fluid, the inlet 10a can be connected to a fan or pump (not shown) remote from the heat exchanger 12.

To allow for equitorial tracking of the sun, upper portion of duct 21 and rod 20 are connected to a tilting mechanism 30 diagramatically shown in FIG. 8 and the duct 21 at its lower end is connected to rotating mechanism 40. Struts 21d support the duct 21 on membrane 7 and are connected to duct 21 via a bearing (not shown). Tilter 30 has a leg 31 pivotally connected to a pivot 32 carried by arm 20 and a reciprocally movable piston 32 connected to a strap 33 attached to duct 21. The base 34 of tilter 30 is secured to the vertical portion of duct 21 and serves to support the heat exchanger 12, reflector 11 as well as the rod 20 and the upper portion of the duct 21. As the piston 35 is moved up and down by a motor (not shown) contained within the tilter 30, the reflector 11 will move clockwise and counterclockwise, respectively, as viewed in FIG. 8. To accommodate this movement, the reflector 11 is cut away at 11a and the upper and lower sections of the duct 21 are connected via accordian-like expansion joints 21c.

The lower portion of duct 21 is conveniently of circular cross-section, on which is mounted a circular gear 41. One strut 21d carries a motor 42 having a circular gear 43 meshing with gear 41. Rotation of the gear 43 via motor 42 will rotate gear 41 and hence will turn the duct 21 in the desired direction, and the cut-out portion 11a likewise permits the reflector 11 to rotate about the vertical axis and clear the struts 21d. This will then orient the reflector 11 in the desired position. By the use of mechanisms 30 and 40, the reflector 11 can track the sun as it moves across the sky. The electrical conduits (not shown) for mechanisms 30 and 40 can pass through or on duct 21b to a remote source of power.

Figure 9:
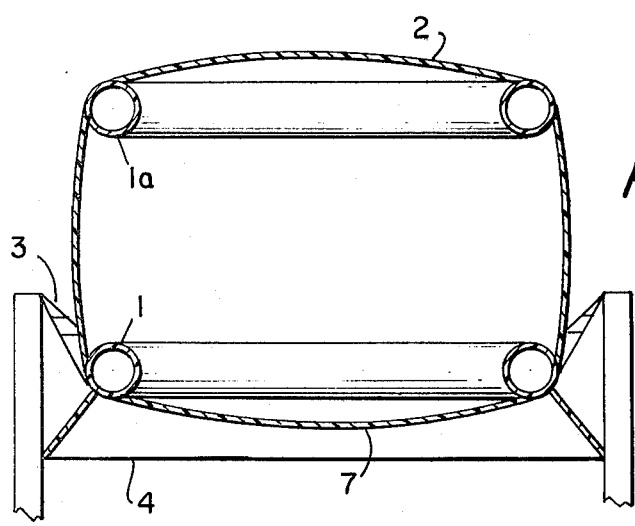
FIG. 9 is a detail view in section of another embodiment of the invention.

FIG. 9 shows a pressurized structure similar to that of FIGS. 6-8, except that an upper pneumatic compression ring 1a has been added to produce a lower profile. Ring 1a is suitably the same size as ring 1.

Figure 10:
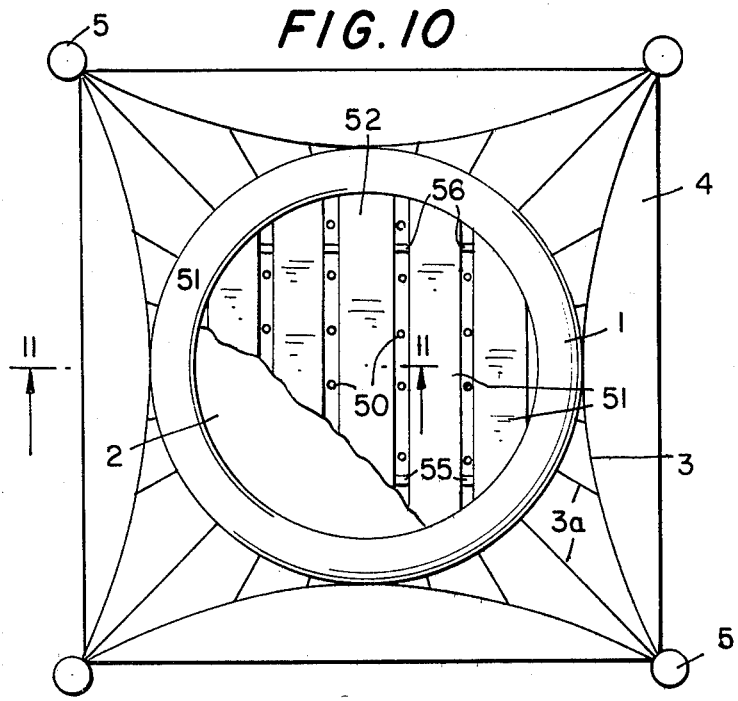
FIG. 10 is a plan view of another embodiment of the invention with part of the top cover broken away.
Figure 11:
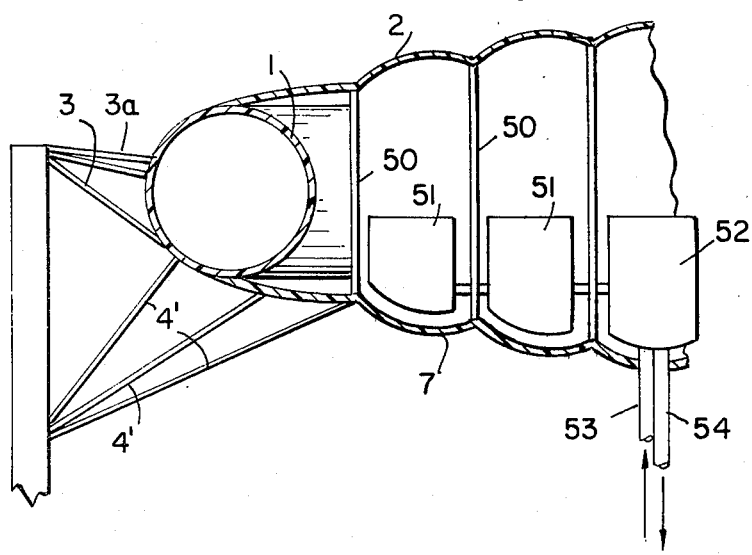
FIG. 11 is a detail view in section along lines 11—11 in FIG. 10.

FIGS. 10 and 11 illustrate an embodiment of the invention in which the upper cover 2 is connected to the lower membrane 7 by an array of vertical cables 50, and the interior space is pressurized, as in FIGS. 5-9. Between adjacent rows of cables 50 lie solar collectors 51 and central solar collector 52. Solar collectors 51 and 52 are shown diagrammatically and may be an array of heat exchange tubes through which is passed a suitable heat exchange fluid, such as air. Thus, the fluid is passed into inlet 53 (FIG. 11) and thence into the bundle of tubes in collector 52. The fluid also flows from inlet 53 to the bundles of tubes in collectors 51 via manifold 55. The heated fluid exits via manifold 56 and outlet 54. Suitable pumping means (not shown) assures fluid flow through the collectors 51 and 52.

The vertical ties are cables, preferably of steel, that stabilize and oppose the internal pressure within the pressurized envelope defined by ring 1, top cover 2 and membrane 7. Compression ring 1 and cables 50 maintain the shape of the structure, and the cables 50 permit a higher pressure and/or a thinner top cover 2 to be used. Under load, the cables 50 relax and a greater load is then assumed by the cable structure 4', which, in turn, is supported by ring 1 to provide a stable, load-bearing structure. In this regard, the bottom of the structure defined by membrane 7 must be of convex curvature in order for proper load distribution.

For each of the embodiments of the invention, it is desirable that the pneumatic compression ring 1 be quite large, since the advantages of the invention are maximized for larger structures and the savings in weight then become most pronounced. A typical size for compression ring 1 is an outer diameter of 60 feet and an inner diameter of 44 feet, the circular cross-section of the ring 1 then having a diameter of 8 feet and a wall thickness of 0.150 inches. The ring 1 is desirably reinforced with circumferentially disposed reinforcing fiber in horizontal and vertical planes.

The top cover 2, the membrane or skirt 4 and the bottom membrane 7 can be of the same or different materials, such as nylon, polyester, fiberglass, vinyl or polyolefin, and can be treated to increase the waterproof and weatherproof properties thereof. These materials can be opaque, translucent or transparent as required. Coil 24 and screens 25 are of metal.

The main cables 3 are preferably glass fiber reinforced plastic or steel cables. Glass-reinforced polyester cables of 1 square inch cross-section and stressed to about 20,000 psi are suitable for the 60-foot structure described above; steel cables can be of smaller diameter. The angle that cable 3 makes with the horizontal is dependent on the ratio of wind load to dead load, as is conventionally determined.

The suspender cables 3a are smaller than main cables 3, and for 1 square inch cross-section main cables, reinforced plastic suspender cables of 0.25 square inch cross-section stressed to 15,000 psi are suitable. Gussets (not shown) are provided where the suspender cables 3a are attached to the compression ring in order to distribute the forces.

The stabilizing membrane 4 is tensioned to resist vertical and lateral movement. Preferably, the membrane 4 is reinforced and gusseted in areas of high stress at the columns 5 and between the columns 5 and ring 1.

For pressurized structures, an internal pressure of 0.75 psia is suitable. For the 60-foot structure described above, this will require a top cover 2 of about 0.013 inches thick with a stress of 10,000 psi. The lower membrane 7 will then be about 0.080 inches thick and the stress is about 8,000 psi. The central area, approximately 7 to 10 feet in diameter, is preferably a rigid plastic disc that provides stable support for the solar energy system.

In the embodiment shown in FIGS. 6–8, the dome formed by cover 2 will be a hemisphere having a 30-foot radius and the membrane 7 will sag about 6 feet below the 8-foot diameter compression ring 7, thus providing a distance of 44 feet from top to bottom of the structure. The reflector 11 is a parabolic reflector of the formula $y^2 = 105.2x$, where x is the distance between pivot 32 and the vertex of reflector 11 and y is the distance between pivot 32 and the top edge of reflector 11, such that when the pivot 32 is located 8 feet from the vertex of the reflector 11, the distance from the pivot 32 to the top edge of the reflector 11 will be 29 feet, leaving a clearance of about 1 foot between the top of reflector 11 and the cover 2. Further, the heat exchanger 12 will be at the focus of the parabola, 26.3 feet from the vertex. More specifically, the heat exchanger 12 will be located to place the focus at the center of chamber 28. Window 23 will be 1 foot in diameter, with the housing 22 being a cylinder 2 feet in diameter and 2 feet long. Coil 24 will be a cylinder 1 foot in diameter and 2½ feet long. Duct 21a has a cross-section of 0.3 square feet and duct 21b a cross-sectional area of 0.64 square feet. These dimensions will provide proper flow of air to and from the collector.

We claim:

1. A pneumatic structure, which comprises:
   (a) a pneumatic compression ring;
   (b) a plurality of substantially vertical columns disposed about said pneumatic compression ring;
   (c) cable means for supporting said pneumatic compression ring, said cable means being suspended from said columns and connected to said pneumatic compression ring to dispose said ring in a substantially horizontal plane;
   (d) a top cover under tension attached to the upper portion of said pneumatic compression ring and closing the central inner opening of said ring and a lower membrane attached to the lower portion of said pneumatic compression ring to close the lower opening of said ring;
   (e) means for stiffening said structure connected to said columns at points below said pneumatic compression ring and extending to said ring; and
   (f) said top cover and said lower membrane being frustoconical and extending away from said pneumatic compression ring, and a column means is provided between said top cover and said lower membrane.

2. The pneumatic structure according to claim 1, wherein said pneumatic compression ring is a toroid of constant circular cross-section.

3. The pneumatic structure according to claim 1, wherein said stiffening means is cable means.

4. The pneumatic structure according to claim 1, wherein said stiffening means is an annular skirt connected at one end to the lower portion of said pneumatic compression ring and at the other end to said columns.

5. The pneumatic structure according to claim 1, wherein said columns are disposed outside said pneumatic compression ring.

6. The pneumatic structure according to claim 5, wherein an outer pneumatic compression ring is disposed about said columns, and outer cable means for supporting said outer pneumatic compression ring is connected between said columns and said outer pneumatic compression ring.

7. The pneumatic structure according to claim 1, wherein said top cover has a plurality of pneumatic ribs.

8. The pneumatic structure according to claim 1, wherein said column means tensions said top cover and lower membrane.

9. The pneumatic structure according to claim 1, wherein said top cover extends away from said pneumatic compression ring, an upper pneumatic compression ring is provided above said first-mentioned pneumatic compression ring and attached to said top cover at the upper portion thereof, the inner space enclosed by said top cover and said lower membrane being at superatmospheric pressure.

* * * * *